United States Patent
Penzo et al.

(10) Patent No.: US 7,582,723 B2
(45) Date of Patent: Sep. 1, 2009

(54) PROCESS AND APPARATUS FOR THE POLYMERIZATION OF ETHYLENE

(75) Inventors: Giuseppe Penzo, Mantova (IT); Cyrus Ahmadzade-Youssefi, Hamburg (DE); Rainer Karer, Kaiserslautern (DE); Ulrich Nieken, Neustadt a.W. (DE)

(73) Assignee: Basell Polyolefine GmbH, Wesseling (DE)

( * ) Notice: Subject to any disclaimer, the term of this patent is extended or adjusted under 35 U.S.C. 154(b) by 270 days.

(21) Appl. No.: 11/883,713

(22) PCT Filed: Jan. 30, 2006

(86) PCT No.: PCT/EP2006/000783

§ 371 (c)(1),
(2), (4) Date: Aug. 3, 2007

(87) PCT Pub. No.: WO2006/082007

PCT Pub. Date: Aug. 10, 2006

(65) Prior Publication Data

US 2008/0177012 A1 Jul. 24, 2008

Related U.S. Application Data

(60) Provisional application No. 60/656,185, filed on Feb. 25, 2005.

(30) Foreign Application Priority Data

Feb. 4, 2005 (DE) .................. 10 2005 005 506

(51) Int. Cl.
*C08F 6/00* (2006.01)
*C08F 2/34* (2006.01)
*B01D 53/72* (2006.01)

(52) U.S. Cl. .............. 528/483; 528/498; 528/501; 526/920; 203/71; 34/79

(58) Field of Classification Search .......... 528/483, 528/498, 501; 203/71; 34/79; 526/920
See application file for complete search history.

(56) References Cited

U.S. PATENT DOCUMENTS

| 4,764,056 A | 8/1988 | Zentgraf et al. |
| 5,165,998 A | 11/1992 | Bailly et al. |
| 5,376,742 A | 12/1994 | Krause |
| 6,228,956 B1 | 5/2001 | Covezzi et al. |

(Continued)

FOREIGN PATENT DOCUMENTS

EP 89691 9/1983

(Continued)

*Primary Examiner*—Fred M Teskin
(74) *Attorney, Agent, or Firm*—Jarrod N. Raphael

(57) ABSTRACT

Process for the polymerization of ethylene or of ethylene with further 1-olefins, in which the ethylene is polymerized in the presence of a catalyst in a gas-phase reactor and reaction gas comprising propane and unpolymerized ethylene is circulated to remove the heat of polymerization, wherein the polymer particles are discharged continuously or discontinuously from the reactor, the polymer particles are separated from the major part of the concomitantly discharged gas and the polymer particles are degassed, the gas is freed of entrained fine particles and is separated from a low-boiling fraction comprising ethylene or from a high boiling fraction containing further 1-olefins or alkanes having from 4 to 12 carbon atoms in a first separation stage, a propane fraction is separated off in a second separation stage and this propane fraction is used for degassing the polymer particles discharged from the reactor, with the proportion of ethylene in the propane fraction being less than 1 mol % and the proportion of 1-olefins and alkanes having from 4 to 12 carbon atoms in the propane fraction being less than 4 mol %, in each case based on the total propane fraction. Furthermore, an apparatus for carrying out the process. In this way, a high heat discharge from the reactor, satisfactory degassing of the discharged polymer particles and recovery of the reaction gas discharged together with the polymer particles and also the gas used for degassing the polymer particles are made possible.

25 Claims, 2 Drawing Sheets

U.S. PATENT DOCUMENTS

Figure 1:
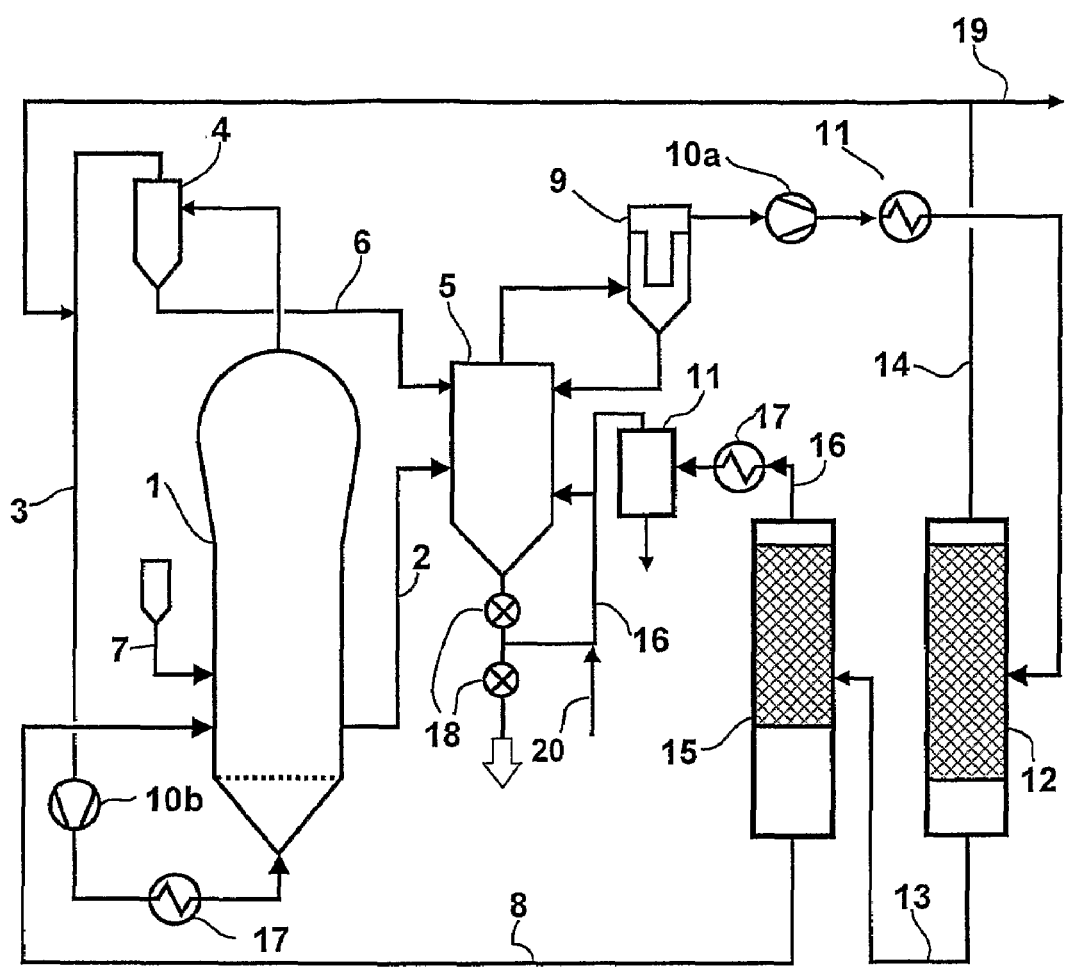

| | | |
|---|---|---|
| 2004/0242810 A1 | 12/2004 | Bell et al. |
| 2006/0034777 A1 | 2/2006 | Mahling et al. |
| 2007/0037935 A1 | 2/2007 | Karer et al. |

FOREIGN PATENT DOCUMENTS

| | | |
|---|---|---|
| EP | 226935 | 7/1987 |
| EP | 475603 | 3/1992 |
| EP | 571826 | 12/1993 |
| EP | 683176 | 11/1995 |
| JP | 60-079017 | 5/1985 |
| WO | 03/011920 | 2/2003 |
| WO | 2004/047959 | 6/2004 |
| WO | 2004/092229 | 10/2004 |

PROCESS AND APPARATUS FOR THE POLYMERIZATION OF ETHYLENE

The invention relates to a process for the polymerization of ethylene or of ethylene with further 1-olefins, in which the ethylene is polymerized in the presence of a catalyst in a gas-phase reactor and reaction gas comprising propane and unpolymerized ethylene is circulated to remove the heat of polymerization, wherein the polymer particles are discharged continuously or discontinuously from the reactor, the polymer particles are separated from the major part of the concomitantly discharged gas and the polymer particles are degassed. It also relates to an apparatus for carrying out the process.

Gas-phase polymerization processes are economical processes for the polymerization of ethylene and propene or for the copolymerization of ethylene or propene with other C2-C8-1-olefins. Such gas-phase polymerization processes can, in particular, be designed as gas-phase fluidized-bed processes in which the polymer particles are kept in suspension by means of a suitable gas stream. Processes of this type are described, for example, in EP-A-0 475 603, EP-A-0 089 691 and EP-A-0 571 826, which are hereby fully incorporated by reference.

In such processes, the polymer particles present in the fluidized bed are discharged continuously or discontinuously and conveyed pneumatically into a degassing vessel. Especially in the copolymerization of ethylene with further 1-olefins such as 1-butene or 1 hexene, considerable amounts of the comonomers together with further relatively high-boiling gases present in the reaction gas or liquids such as hexane remain in the polymer particles. These are therefore treated with a stripping gas to remove a considerable proportion of the relatively high-boiling comonomers in the degassing vessel. For cost reasons, nitrogen is usually used for this purpose. Particularly in the case of the chromium-catalyzed polymerization of ethylene, the nitrogen has to be pure nitrogen ($O2<2$ vppm, $H2O<2$ vppm), which incurs not inconsiderable costs. In addition, EP-A-683 176, for example, describes the use of the reaction mixture or of constituents of the reaction mixture, preferably in a mixture with nitrogen. As constituents of the reaction mixture, mention is made not only of ethylene and hydrogen but also of nitrogen and C1-C12-, preferably C4-C8-alkanes as inert constituents. When the polymer particles are discharged from the reactor, not inconsiderable amounts of ethylene are also discharged from the reactor together with the polymer particles and, because separation of nitrogen and ethylene is quite complicated or costly, e.g. by means of a membrane unit, this ethylene is usually not recovered and is lost to the process. In addition, JP 60-079017 discloses degassing of the polymer particles in a downstream silo by means of inert hydrocarbons, with the hydrocarbon used for degassing having the same number of carbon atoms as the 1-olefin to be removed.

U.S. Pat. No. 5,376,742 and WO 03/011920 disclose a process for polymerization of olefin monomer including ethylene and/or propylene with at least one alpha-olefin in a fluidized bed gas phase reactor wherein part of the effluent stream (recycle gas) from the reactor is separated and used for degassing the polymer. The heavy hydrocarbons and, in WO 03/011920, additionally the monomers are removed from the gas before its use for the degassing. The disadvantage of this degassing method is that the gas is taken from the recycle line and fed back to it after the degassing. Therefore the degassing cycle is highly dependent on the conditions, particularly the pressure, in the reactor. Further the heat removal from the polymerization reactor is limited by the use of nitrogen.

It is therefore an object of the present invention to overcome the abovementioned disadvantages of the prior art and to provide a process and an apparatus which makes possible not only a high heat discharge from the reactor, satisfactory degassing of the discharged polymer particles and recovery of the reaction gas discharged together with the polymer particles but also the provision of the gas used for degassing the polymer particles.

This object is achieved by a process for the polymerization of ethylene or of ethylene with further 1-olefins, in which the ethylene is polymerized in the presence of a catalyst in a gas-phase reactor to form polymer particles and reaction gas comprising propane and unpolymerized ethylene is circulated to remove the heat of polymerization, wherein the polymer particles are discharged continuously or discontinuously from the reactor, the polymer particles are separated from the major part of the concomitantly discharged gas and the polymer particles are degassed, the gas is freed of entrained fine particles the gas is Separated from a low-boiling fraction comprising ethylene or from a high boiling fraction containing further 1-olefins or alkanes having from 4 to 12 carbon atoms in a first separation stage, a propane fraction is separated off in a second separation stage and this propane fraction is used for degassing the polymer particles discharged from the reactor, with the partial pressure of ethylene in the propane fraction used for degassing being less than 6000 Pa and the partial pressure of the sum of further 1-olefins and alkanes having from 4 to 12 carbon atoms in the propane fraction being less than 10000 Pa.

Unless indicated otherwise, all statements made regarding the composition of the reaction gas are based on the conditions prevailing in the reactor and those made regarding the recycle gas are based on the composition in the recycle gas line upstream of the first separation column.

The present invention ensures a high heat discharge from the reactor both in the noncondensed mode and in the condensed mode and sufficient degassing of the discharged polymer particles. The corresponding work-up and use of the propane used in the recycle gas for degassing the discharged polymer particles ensures a high degree of recovery of the reaction gas comprising ethylene and propane and of the stripping gas which preferably consists essentially of propane under particularly economical operating conditions. In particular, ethylene recovery is also maximized by means of the present invention, since only small amounts of ethylene are removed from the recycle gas together with the discharged ethane. Further advantages of the present invention can be derived from the following description.

The gas-phase reactor can be any type of gas-phase reactor, for example either a gas-phase fluidized-bed reactor or a stirred gas-phase reactor, with the use of proportions of condensed material also being possible. For the purposes of the process of the invention, it is important that at least part of the reaction fluid is in the gaseous state and the polymer is in particulate form.

Discharge from the reactor can be carried out pneumatically or with the aid of mechanical discharge systems, with pneumatic discharge being preferred. In the simplest and particularly preferred case, discharge is achieved by means of the pressure gradient prevailing between the reactor and a downstream degassing vessel.

The separation of the polymer particles discharged from the reactor from the major part of the discharged gas can be carried out together with or separately from the degassing of the polymer particles by means of the propane fraction, either in terms of time or in terms of space. For example, the separation of the particles from the gas can be carried out in a first vessel and the stripping with the propane can be carried out subsequently in a second vessel. As an alternative, in the case of discontinuous discharge, the major part of the reaction gas can firstly be separated off from the particles and the degassing with propane can subsequently be carried out in the same vessel. However, preference is given to the degassing of the polymer particles by means of the propane fraction and the separation of the polymer particles from the major part of the discharged gas to be effected simultaneously and/or in the same place. The degassing of the polymer particles by means of the propane fraction and the separation of the polymer particles from the major part of the discharged gas is particularly preferably effected immediately after discharge from the reactor in one degassing vessel. The parallel arrangement of two or more degassing vessels is obviously possible.

The degassing of the polymers is preferably performed counter-currently.

Degassing of the polymer particles according to the present invention means that the content of further 1-olefins and/or alkanes having 4 to 12 carbon atoms in the polymer particles is reduced by means of gas to a given.

In the degassing vessel as first degassing stage, the residual loading of the polymer with the relatively high-boiling dissolved components such as butene, hexene or hexane should be very low so as to keep the loss of hydrocarbons as low as possible. Preference is given to a residual loading of less than 2500 ppm by weight, particularly preferably less or equal 500 ppm by weight. To achieve this low residual loading, the propane used for degassing in the degassing vessel under the degassing conditions should have a partial pressure of less than 10000 Pa, preferably less than 2500 Pa, more preferably less than 500 Pa, of further 1-olefins and alkanes having from 4 to 12 carbon atoms. The partial pressure proportion of 1-olefins and alkanes having from 4 to 12 carbon atoms in the propane fraction is particularly preferably less than 250 Pa, in particular less than 25 Pa mol %.

For common pressures in the degassing vessel the corresponding total proportion of further 1-olefins and alkanes should preferably be less than 4 mol %, more preferably less than 1 mol %, more preferably less than 0.2 mol %, particularly preferably less than 0.1 mol %, most preferably less than 0.01 mol %.

To improve degassing, the propane fraction can additionally be brought to elevated temperatures by means of a heat exchanger. However, the temperature should in this case be significantly below the softening temperature of the polymer to be degassed.

Furthermore, the proportion of ethylene in the propane fraction used in the degassing vessel should be less than 6000 Pa is preferably less than 1500 Pa, more preferably less than 750 Pa, in particular less than 300 Pa. For common pressures in the degassing vessel the corresponding total proportion of Ethylene in the propane fraction should be less than 4 mol %, preferably less than 1 mol %, more preferably less than 0.5 mol %, in particular less than 0.2 mol %. As a result of this low ethylene content, after-polymerization in the degassing vessel is largely suppressed. Customary separation methods are employed for separating off the low-boiling fraction in the first separation stage and for separating off the propane fraction in the second separation stage. Examples of separation techniques which may be employed here are separation by distillation and separation by means of selectively permeable membranes, without the invention being restricted to these. Rather, it is possible to use any separation unit to achieve the advantages of the process of the invention, as long as the purity according to the invention of the propane fraction can be achieved using this. Preference is given to separation by distillation. Since the degassing cycle is decoupled from the main recycling stream of the reactor the pressure in the degassing cycle can be set to higher values than in the reactor. This allows depending on the site conditions the use of cooling water to condensate the distillate instead of using a refrigeration unit to provide the necessary cooling.

Preference is given to selecting the 1-olefins from among 1 butene, 1-hexene and 1-octene and/or selecting the alkanes from among n-butane, n-hexane and n octane.

In addition to ethylene and propane, the reaction gas can further comprise additional inert gases such as nitrogen (N2). In addition, ethane is always present in varying amounts in the ethylene. To provide a sufficient amount of propane for degassing, the proportion of propane in the reaction gas should be 30 mol % or more. As an alternative, fresh propane can be introduced in addition to the propane fraction upstream of the degassing vessel, but this is less advantageous. In an advantageous embodiment of the present invention, a maximum of 10 mol %, particularly preferably a maximum of 5 mol %, of other gases or liquids are present in addition to ethylene, further 1-olefins and propane in the reactor. The reaction gas is particularly preferably free of inert gases with the exception of aliphatic hydrocarbons. Very particular preference is given to the reaction gas consisting essentially of only ethylene, if appropriate further 1-olefins and propane. When nitrogen is completely replaced by propane, the specific heat capacity of the recycle gas is maximized, as a result of which the recycle gas volume flow necessary for removing the heat of polymerization can be minimized. In this way, it is possible to make peripheral apparatuses such as compressors, heat exchangers, recycle gas line, etc., smaller or increase the output. In addition, when the amount of nitrogen is very small it is possible to pass the ethane bled off from the recycle gas directly as feed to a cracker, instead of burning it for heating purposes or flaring it.

The heat discharge from the gas-phase fluidized-bed reactor can be achieved exclusively by the circulated gas in the noncondensed mode. It can also be advantageous to take the reaction gas from the reactor, partly condense the reaction gas, preferably containing mainly propane, and recirculate the condensate together with or separately from the uncondensed gas, so that the reactor is operated in the condensed mode.

In a preferred variant of the present invention, the ethylene separated off in the first separation stage is recirculated to the reactor together with other low boilers such as ethane. Furthermore, preference is given to at least part of the ethane separated off in the first separation stage being discharged from the process as a purge gas stream.

The removal of the fine particles (fines) from the gas entering the first separation stage can be performed by any method. The removal is preferably performed by using filters. Preferred filter systems are described in Freeing according to the present invention means the fine particles are removed from the gas stream to an extend avoiding polymerization in the separation stages. Preferably the fine particles are essentially removed.

In a particular preferred embodiment of the present invention a process for the polymerization of ethylene or of ethylene with further 1-olefins is provided, in which the ethylene is polymerized in the presence of a catalyst in a gas-phase reactor to form polymer particles and reaction gas comprising propane and unpolymerized ethylene is circulated to remove the heat of polymerization, wherein the polymer particles are discharged continuously or discontinuously from the reactor, the polymer particles are separated from the major part of the concomitantly discharged gas and the polymer particles are degassed, the gas is freed of entrained fine particles the gas is separated from a low-boiling fraction comprising ethylene in a first separation stage, a propane fraction is separated off in a second separation stage and this propane fraction is used for degassing the polymer particles discharged from the reactor, with the proportion of ethylene in the propane fraction used for degassing being less than 1 mol % and the proportion of the sum of further 1-olefins and alkanes having from 4 to 12 carbon atoms in the propane fraction being less than 4 mol %.

The present invention further provides as a first alternative an apparatus for carrying out the process according to any of the preceding claims comprising a gas-phase reactor containing a bed of polymer particles, a recycle gas line connected to the reactor for carrying away and recirculating the reaction gas comprising propane and unpolymerized ethylene, a product offtake line for continuously or discontinuously taking off polymer particles from the reactor, which line is connected to a degassing vessel for the separation of polymer particles and gas, a particle precipitation unit for freeing the gas of entrained fine particles connected to the degassing vessel, a first separation unit for separating off a low-boiling fraction comprising ethylene connected to the particle precipitation unit, a second separation unit for separating off a propane fraction connected to the bottom of the first separation unit, a propane line which is connected to the top of the second separation unit and is in turn connected to the degassing vessel to make it possible to degas the polymer particles by means of the propane fraction, which is passing the polymer, wherein the first separation unit is designed so that the partial pressure of ethylene in the propane fraction entering the degassing vessel is less than 6000 Pa and the second separation unit is designed so that the proportion of 1-olefins and alkanes having from 4 to 12 carbon atoms in the propane fraction entering the degassing vessel is less than 10000 Pa.

In alternative but less preferred embodiment the present invention provides an apparatus for carrying out the process according to any of the preceding claims comprising a gas-phase reactor containing a bed of polymer particles, a recycle gas line connected to the reactor for carrying away and recirculating the reaction gas comprising propane and unpolymerized ethylene, a product offtake line for continuously or discontinuously taking off polymer particles from the reactor, which line is connected to a degassing vessel for the separation of polymer particles and gas, a particle precipitation unit for freeing the gas of entrained fine particles connected to the degassing vessel, a first separation unit for separating off a high-boiling fraction comprising further 1-olefins and/or alkanes having 4 to 10 carbon atoms connected to the particle precipitation unit (9), a second separation unit for separating off a propane fraction connected to the top of the first separation unit, a propane line which is connected to the bottom of the second separation column and is in turn connected to the degassing vessel to make it possible to degas the polymer particles by means of the propane fraction after passing an evaporization unit, wherein the first separation unit is designed so that the proportion of 1-olefins and alkanes having from 4 to 12 carbon atoms in the propane fraction entering the degassing vessel is less than 10000 Pa and the second separation unit is designed so that Pa the partial pressure of ethylene in the propane fraction entering the degassing vessel is less than 6000 Pa.

Preference is given to using a first separation unit and/or a second separation unit which allow separation by distillation. Particular preference is given to appropriately designed separation columns.

The first alternative is preferred if a distillation is used since an evaporation of the propane fraction coming from the bottom of the second column can be avoided if the propane fraction is the top product of the second separation unit.

Finally, the present invention provides for the use of propane having a proportion of ethylene of less than 4 mol % and a proportion of the sum of 1-olefins and alkanes having from 4 to 12 carbon atoms of less than 4 mol %, in each case based on the total amount of gas, for degassing ethylene homopolymers or ethylene copolymers. Part of this propane is obtained from the gas discharged from a gas-phase polymerization reactor together with the polymer particles.

The invention is illustrated below by way of example with the aid of drawings for a gas-phase fluidized-bed reactor and the copolymerization of ethylene with 1 hexene, without the invention being restricted thereto.

Figure 2:
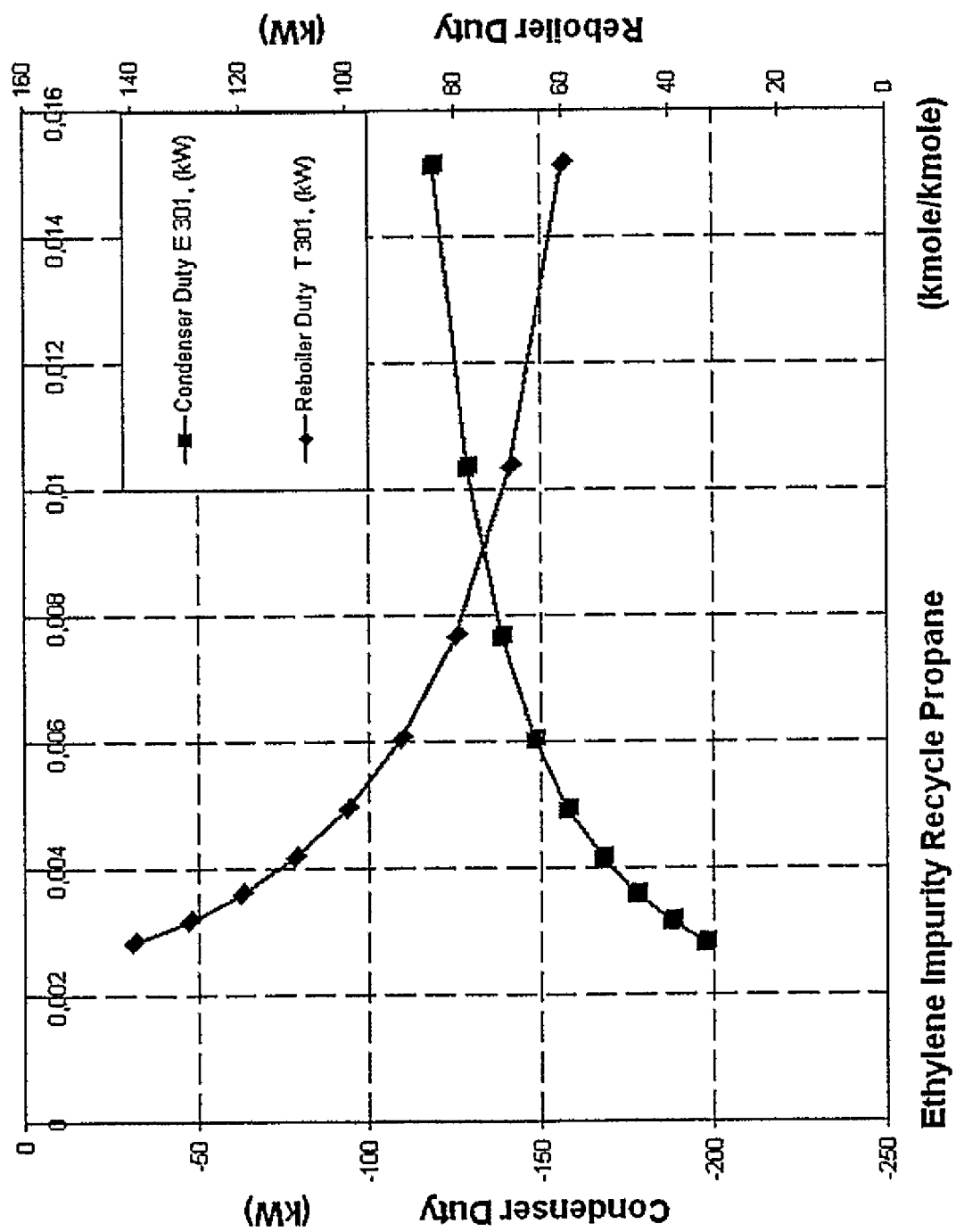

In the figures:

FIG. 1 shows the flow diagram of a polymerization plant of a preferred embodiment of the invention, FIG. 2 shows the dependence of the ethylene content of the propane fraction as a function of the mode of operation of the first separation column.

FIG. 1 shows the flow diagram of a polymerization plant according to a preferred embodiment of the invention having a gas-phase fluidized-bed reactor 1. The gas-phase fluidized-bed reactor 1 comprises a cylindrical tube in which the fluidized bed, which usually consists of polymer particles kept in suspension in the gas phase by means of a stream of gas, is located. The velocity of the reaction gas has to be high enough firstly to fluidize the mixed bed of polymer particles which is located in the tube and serves as polymerization zone and secondly to remove the heat of polymerization effectively. To improve heat removal, it is possible, if desired, to make additional use of the enthalpy of vaporization of condensed reaction gas constituents by feeding a reaction gas comprising not only a gas or a gas mixture but also condensed fluids which vaporize in the reactor into the fluidized bed.

The fluidized bed is usually bounded at the bottom by a gas distributor plate. At the top, the cylindrical part is usually adjoined by a widening disengagement zone which reduces the discharge of particles from the reactor 1. In an alternative embodiment, the disengagement zone can also be omitted. The reaction gas leaves the reactor 1 at the upper end of the disengagement zone and is conveyed in the recycle gas line 3 via a cyclone 4 to the compressor 10b and from there via a heat exchanger 17 in which the recycle gas is cooled back to the reactor 1. The recycle gas can, if appropriate, be cooled to below the dew point of one or more of the recycle gas components in the heat exchanger so as to operate the reactor with condensed material, i.e. in the condensed mode.

When the apparatus is used for the polymerization of ethylene, the circulated reaction gas (recycle gas) comprises a mixture of ethylene, if desired a molecular weight regulator such as hydrogen and propane and/or further saturated hydrocarbons such as ethane, butane, pentane or hexane. In addition, depending on the catalyst, further additives and auxiliaries such as metal alkyls, antistatics, catalyst poisons, etc., can also be used. The use of nitrogen in conjunction with the degassing by means of propane is less advantageous, since it can only be separated off from the ethylene again with considerable difficulty. In addition, the reaction gas can further comprise C3-C8-1-olefins such as propene, 1-butene, 1-pentene, 2-methylpentene, 1 hexene, 1-heptene and 1-octene as comonomers, and these can also be present in condensed form. Preference is given to a process in which ethylene is copolymerized with 1-hexene or 1-butene. To set constant reaction conditions, the constituents of the reaction gas can be fed into the gas-phase fluidized-bed reactor either directly or via the circulated reaction gas.

The capacity of the gas-phase fluidized-bed reactor 1 is known to be limited by the cooling capacity of the circulated reaction gas. The cooling capacity is dependent not only on the heat capacity, i.e. the chemical composition, of the reaction gas but also, inter alia, on the pressure of the reaction gas or at which the (co)polymerization is carried out. Here, it is generally advisable to work at pressures of from 0.1 to 10 MPa, preferably from 1 to 8 MPa, particularly preferably from 1.5 to 5 MPa, in particular from 2 to 3 MPa. The cooling capacity also depends on the reactor temperature at which the (co)polymerization in the fluidized bed is carried out. For the purposes of the process of the invention, it is advantageous to work at temperatures of from 30 to 125° C., particularly preferably from 75 to 118° C., with temperatures in the upper part of this range preferably being set for copolymers of relatively high density and temperatures in the lower part of this range preferably being set for copolymers of relatively low density. Furthermore, the amount of catalyst introduced determines the product output.

The catalyst or catalysts is/are introduced via one or more catalyst metering devices 7, for example by means of the dry metering device disclosed in EP-A-226935, which is hereby fully incorporated by reference. In combination with the degassing by means of propane, it is particularly advantageous for the metered addition likewise to be carried out by means of propane, preferably by means of liquid propane, as in WO 04/092229, which is hereby fully incorporated by reference. The propane is preferably likewise taken from the propane fraction. As catalysts, it is possible to use all known types of catalyst which are suitable for olefin polymerization. Particular mention may be made of Ziegler catalysts, chromium-based Phillips catalysts and single-site catalysts, in particular metallocene catalysts, without being restricted thereto. For the purposes of the present invention, single-site catalysts comprise, unlike chromium and Ziegler/Natta catalysts, at least one defined organometallic transition metal compound and usually further activating compounds and, if appropriate, support and also further additives and auxiliaries. Combinations of catalysts (hybrid catalysts) can also be used advantageously, with combinations of different single-site catalysts being preferred. The catalysts can be immobilized together on a support or can be metered separately into the reactor.

Depending on the catalyst used, the polymer particles usually have a mean size of from a few hundred to a few thousand microns. In the case of chromium catalysts, the mean particles have a size of from about 400 to 600 μm, and in the case of Ziegler catalysts the mean particle size is about 1500-2000 μm.

The polymer particles are taken from the reactor 1 pneumatically via one or more product offtake lines 2. The product can be discharged continuously or discontinuously, with discontinuous discharge being preferred. The polymer is freed of the major part of the gas carried with it in a degassing vessel 5 and is treated with purified propane which has been worked up as described in more detail below. The pressure in the degassing vessel 5 is about 0.1-0.4 MPa, preferably 0.15 to 0.35 MPa. The degassing by means of propane reduces the residual content of further 1-olefins and relatively nonvolatile inert gases, for example hexane, adsorbed on the polymer particles to contents of about 0.25% by weight, preferably less than 0.05% by weight. The degassed polymer particles are subsequently taken from the degassing vessel 5 by means of star feeders 18 and conveyed to a degassing silo (not shown) where further degassing by means of nitrogen or as described in WO 04/047959 is carried out. To prevent impurities from travelling back from downstream work-up apparatuses into the degassing vessel 5, a further propane gas stream can be fed in as barrier gas between the star feeders 18. The residence times of the polymer in the degassing vessel are between 10 minutes and 8 hours depending on the content of further 1-olefins and/or alkanes having 4 to 12 carbon atoms. Preferred are 15 minutes to 5 hours.

The gas which has been freed of the polymer particles in the degassing vessel 5, which normally contains considerable amounts of entrained fine dust, is passed to a recycle gas filter 9 in which the gas is largely freed of the fine dust. The purified gas is compressed in a compressor 10a to a pressure of from 2.0 to 4 MPa, preferably 2.3 to 3.5 MPa, and is, after condensed material has been separated off in a liquid precipitator 11, subjected to a two-stage separation by distillation.

In a first separation unit, configured as a separation column 12, a low-boiling fraction containing ethylene, preferably consisting essentially of ethylene and ethane, up to 55% of propane and possibly further low-boiling recycle gas components like hydrogen (C2 fraction) is separated off and conveyed from the top of the column via the gas return line 14 to the recycle gas line 3. This ensures minimization of the ethylene losses via the discharge system, since the ethylene goes back to the polymerization circuit.

To avoid accumulation of ethane in the circuit, which is a by-product of the cracker and/or is generated as a by-product during polymerization, ethane is bled off via the ethane purge line 19. The ethane discharged can be fed directly as feed to a cracker. Together with the ethane further undesirable by-products otherwise accumulating in the circuit can be removed.

Since ethane discharging causes also propane losses a side stream of the low boiling fraction (top-product of column 12) may be fed to a further columns (not shown) to separate the propane residues and to concentrate the low boiling content like ethane, ethylene and hydrogen.

The bottoms from the first separation column 12 which are enriched in relatively high-boiling hydrocarbons (C3+ fraction), consisting essentially of propane, the other 1-olefins and saturated hydrocarbons, are fed via a connecting line 13 to a second separation unit configured as a separation column 15. Essentially pure propane is obtained at the top of this second separation column 15, while all heavier hydrocarbons are present in the bottoms. The column is designed so that the content of higher hydrocarbons such as 1-hexene, 1-butene or n hexane is preferably less than 0.1 mol % and that of ethylene is less than 1 mol %, corresponding to 150 and 15 Pa at a degassing pressure of 0.15 MPa, respectively. The dependence of the ethylene content of the propane fraction as a function of the mode of operation of the first separation column is shown in FIG. 2 as an example.

In an alternative embodiment not shown in FIG. 1 the separation columns can be exchanged. In this way the high boiling fraction containing the further 1-olefins and alkanes having 4 to 12 carbon atoms is separated in the first stage and afterwards the top product (distillate) is split into a clean propane fraction and the low boiling fraction containing ethylene and ethane.

The design of columns is generally known to those skilled in the art. In particular, the amount of propane obtained can be set in a simple manner via the power of the vaporizer of the second separation column or by a valve located between the second distillation column 15 and the degassing vessel. The purity of the propane in respect of ethylene can be influenced by the power of the vaporizer of the first column, while the content of higher hydrocarbons in the propane is adjusted via the reflux ratio in the second separation column 15. The temperature of the bottom product in the second separation column 15 should be below 120° C. in order to allow utilising low pressure steam as heating medium and to avoid ongoing reaction with 1-olefins. The temperature of the liquid bottom product is adjusted by means of the flow of distillate (C2 fraction) in the first separation column. The dependence of the ethylene content of the propane fraction on the power of the vaporizer (right-hand scale) and condenser (left-hand scale) of the first separation column 12 is shown as an example in FIG. 2. The higher the heat stream to the vaporizer of the column 12 the lower is the content of ethylene in the propane fraction. As an alternative, one or both of the columns can also be replaced by a membrane separation unit or other separation unit although it is less preferred. The bottom temperature of column 15 is regulated by mass flow rate of the bottom fraction. The bottom temperature should on the one hand be low enough to allow the heating of the bottom vaporizer of column 15 by low pressure steam. On the other hand very high temperature should be avoided to suppress the polymerization of ethylene and further 1-olefins with catalyst residues.

The propane which has been purified in this way is conveyed via the propane line 16 to the heat exchanger 17, heated to a temperature which is from 5 to 20° C. below the softening point of the polymer, preferably to about 100° C., and subsequently fed into the degassing vessel 5. In the degassing vessel the primary degassing of the polymer particles is carried out and the stripping loop is closed.

The low hexene content of the propane ensures degassing of the polymer to a low residual hexene content, while the low ethylene content prevents appreciable after-polymerization and thus the formation of oligomers (gels). Particularly the quality of film products is highly decreased by such gels.

The use of the propane used for removal of the heat of polymerization as inert gas for the degassing of the polymer also makes it possible to achieve a high degree of recovery both of the ethylene and of the degassing agent, which is advantageous both from an economic point of view and from an ecological point of view. Furthermore, propane has a significantly greater heat capacity than nitrogen, which increases the heat discharge.

The 1-hexene and any hexane enriched in the bottoms from the second separation column 15 is/are recirculated via the gas return line 8 and a condensation vessel (not shown) to the reactor 1. Any hexane present can subsequently be employed for metering in reaction auxiliaries such as antistatics or metal alkyls (scavengers). The small losses of propane which occur despite the use of the process of the invention are compensated by introduction of appropriate amounts of fresh propane into the recycle gas line 3. Alternatively, particularly if Ziegler Catalyst used, the propane may have its source from that used for catalyst preparation and/or for catalyst feeding.

A particularly advantageous aspect is that the purified propane can also be used for the metered addition of the catalyst. For this purpose, propane is depressurized in the catalyst metering device 7 into the reactor 1 and thus vaporized, as described in WO 2004/092229. The propane can be used in this way in liquid form or as a gas.

The fine dust separated off from the reaction gas in the cyclone 4 is advantageously added to the product in the degassing vessel 5 via the fine dust line 6 or alternatively fed back into the reactor 1. In this case it is very useful to add a catalyst poison to the recycling gas before entering the cyclone ensuring that no active catalyst residues enter the degassing vessel 5.

It may be emphasized that the specific embodiments described here merely serve to illustrate the invention and do not constitute a restriction. In particular, the process can also be applied to other polymerization processes in the condensed phase, as long as relatively high-boiling components (e.g. butene/butane, pentene/pentane, hexene/hexane) can be removed from the polymer by means of propane and are to be removed in this way. In addition, further embodiments by means of which use can be made of the inventive idea described are also conceivable.

The present application claims priority of the German Patent application No. 10 2005 005 506.0 which is fully incorporated herein by reference. All percentages and parts of this application are related to mass except otherwise indicated.

EXAMPLES

The solubility of gases like hexane, hexene and butene in the polymer and the corresponding vapour pressures have been determined by laboratory experiments for two typical polyethylene products using a Ziegler and a Chromium catalyst. From these data the necessary amounts of strip gas (propane) have been calculated using fundamental thermodynamic equations to achieve a concentration of hexane and hexane below 500 ppm by mass. The production rate of the reactor was 40 t/h. The results are displayed in the following table.

| | | Example 1 | Example 2 |
|---|---|---|---|
| | | Catalyst Type | |
| | | Ziegler | Chromium (Phillips) |
| Density | [kg/m$^3$] | 919 | 942 |
| Reactor pressure | [MPa] | 2.3 | 2.0 |
| Reactor temperature | [° C.] | 85 | 115 |
| Degassing pressure | [MPa] | 0.25 | 0.25 |
| 1-Hexene concentration | [Vol %] | 3.3 | 0.1 |
| Hexane concentration | [Vol %] | 0 | 5.0 |
| Solubility | [kg/kg Polymer] | 0.034 | 0.019 |
| Propane stream | [kg/h] | 3900 | 1500 |
| Product Residence time | [h] | 3.5 | 1.0 |

| List of reference numerals | |
| --- | --- |
| 1 | Gas-phase fluidized-bed reactor |
| 2 | Product offtake line |
| 3 | Recycle gas line |
| 4 | Cyclone |
| 5 | Degassing vessel |
| 6 | Fine dust line |
| 7 | Catalyst metering device |
| 8 | Gas return line (C4+) |
| 9 | Recycle gas filter |
| 10a, 10b | Compressor |
| 11 | Heat exchanger |
| 12 | First separation column |
| 13 | Connecting line |
| 14 | Gas return line (C2) |
| 15 | Second separation column |
| 16 | Propane line |
| 17 | Heat exchanger |
| 18 | Star feeders |
| 19 | Ethane purge line |
| 20 | Fresh propane feed line |

The invention claimed is:

1. A process for the polymerizing ethylene or ethylene with further 1-olefins, in which the ethylene is polymerized in the presence of a catalyst in a gas-phase reactor to form polymer particles, the gas-phase reactor comprising a reaction gas comprising propane and unpolymerized ethylene, and the reaction gas being circulated to remove heat of polymerization; the process comprising:

the polymer particles are discharged continuously or discontinuously from the reactor;

the polymer particles are separated from a major part of concomitantly discharged gas, and the polymer particles are degassed;

gas is freed of entrained fine particles;

in a first separation stage, gas is separated from a low-boiling fraction comprising ethylene, or from a high boiling fraction comprising further 1-olefins or alkanes, the 1-olefins or alkanes comprising from 4 to 12 carbon atoms;

in a second separation stage, a propane fraction is separated off and the propane fraction is used for degassing the polymer particles discharged from the reactor;

wherein a partial pressure of ethylene in the propane fraction used for degassing is less than 6000 Pa, and a partial pressure of a sum of further 1-olefins and alkanes comprising from 4 to 12 carbon atoms in the propane fraction is less than 10000 Pa.

2. The process according to claim 1, wherein the 1-olefins are selected from 1-butene, 1-hexene, and 1-octene, and the alkanes are selected from n-butane, n-pentane, isopentane, n-hexane and n-octane.

3. The process according to claim 1, wherein the propane fraction comprises less than 0.5 mol % of a proportion of ethylene.

4. The process according to claim 1, wherein the propane fraction comprises less than 0.2 mol % of a proportion of ethylene.

5. The process according to claim 1, wherein a partial pressure of ethylene in the propane fraction is less than 750 Pa.

6. The process according to claim 1, wherein a partial pressure of ethylene in the propane fraction is less than 300 Pa.

7. The process according to claim 1, wherein a proportion of 1-olefins and alkanes comprising from 4 to 12 carbon atoms in the propane fraction is less than 0.01 mol %.

8. The process according claim 1, wherein a proportion of 1-olefins and alkanes comprising from 4 to 12 carbon atoms in the propane fraction is less than 0.01 mol %.

9. The process according to claim 1, wherein a vapour pressure of 1-olefins and alkanes comprising from 4 to 12 carbon atoms in the propane fraction is less than 150 Pa.

10. The process according to claim 1, wherein a vapour pressure of 1-olefins and alkanes comprising from 4 to 12 carbon atoms in the propane fraction is less than 15 Pa.

11. The process according to claim 1, wherein the process further comprises circulated gas, the circulated gas comprising propane in an amount of at least 20 mol %.

12. The process according to claim 1, wherein the process further comprises circulated gas, the circulated gas comprising propane in an amount of at least 30 mol %.

13. The process according to claim 1, wherein a maximum of 10 mol % of other gases or liquids are present in addition to ethylene, further 1-olefins, hydrogen and propane in the reactor.

14. The process according to claim 1, wherein a maximum of 5 mol % of other gases or liquids are present in addition to ethylene, further 1-olefins, hydrogen and propane in the reactor.

15. The process according to claim 1, wherein the polymer particles are degassed by using the propane fraction, and the separation of the polymer particles from the major part of the discharged gas is carried out simultaneously, in the same place, or simultaneously and in the same place.

16. The process according to claim 1, wherein the reaction gas is taken from the reactor, and part of the reaction gas is condensed and is recirculated together with, or separately, from the uncondensed reactor gas.

17. The process according to claim 1, wherein the low-boiling fraction separated off in the first separation stage is recirculated to the reactor.

18. The process according to claim 1, wherein the high boiling fraction comprising further 1-olefins or alkanes comprising from 4 to 12 carbon atoms is recirculated to the reactor.

19. The process according to claim 1, wherein at least part of the ethylene separated off in the first separation stage is discharged.

20. The process according to claim 1, wherein the propane fraction is used for metered addition of at least one catalyst.

21. An apparatus for carrying out a process for polymerizing ethylene or ethylene with further 1-olefins, in which the ethylene is polymerized in presence of a catalyst in a gas-phase reactor to form polymer particles, the gas-phase reactor comprising a reaction gas comprising propane and unpolymerized ethylene, and the reaction gas being circulated to remove heat of polymerization; the process comprising:

the polymer particles are discharged continuously or discontinuously from the reactor;

the polymer particles are separated from a major part of concomitantly discharged gas, and the polymer particles are degassed;

gas is freed of entrained fine particles;

in a first separation stage, gas is separated from a low-boiling fraction comprising ethylene, or from a high boiling fraction comprising further 1-olefins or alkanes, the 1-olefins or alkanes comprising from 4 to 12 carbon atoms;

in a second separation stage, a propane fraction is separated off and the propane fraction is used for degassing the polymer particles discharged from the reactor;

wherein a partial pressure of ethylene in the propane fraction used for degassing is less than 6000 Pa, and a partial pressure of a sum of further 1-olefins and alkanes comprising from 4 to 12 carbon atoms in the propane fraction is less than 10000 Pa; the apparatus comprising:

a gas-phase reactor comprising a bed of polymer particles;

a recycle gas line connected to the reactor for carrying away and recirculating reaction gas, wherein the reaction gas comprises propane and unpolymerized ethylene;

a product offtake line for continuously or discontinuously taking off polymer particles from the reactor, wherein the product offtake line is connected to a degassing vessel for separating polymer particles and gas;

a particle precipitation unit connected to the degassing vessel for freeing gas of entrained fine particles;

a first separation unit connected to the particle precipitation unit for separating off a low-boiling fraction comprising ethylene and ethane;

a second separation unit connected to a bottom of the first separation unit for separating off a propane fraction;

a propane line which is connected to a top of the second separation unit and in turn is connected to the degassing vessel to degas the polymer particles using the propane fraction;

wherein the first separation unit is such that the partial pressure of ethylene in the propane fraction entering the degassing vessel is less than 6000 Pa, and the second separation unit is such that the partial pressure of 1-olefins and alkanes comprising from 4 to 12 carbon atoms in the propane fraction entering the degassing vessel is less than 10000 Pa.

22. An apparatus for carrying out a process for polymerizing ethylene or ethylene with further 1-olefins, in which the ethylene is polymerized in presence of a catalyst in a gas-phase reactor to form polymer particles, the gas-phase reactor comprising a reaction gas comprising propane and unpolymerized ethylene, and the reaction gas being circulated to remove heat of polymerization; the process comprising:

the polymer particles are discharged continuously or discontinuously from the reactor;

the polymer particles are separated from a major part of concomitantly discharged gas, and the polymer particles are degassed;

gas is freed of entrained fine particles;

in a first separation stage, gas is separated from a low-boiling fraction comprising ethylene, or from a high boiling fraction comprising further 1-olefins or alkanes, the 1-olefins or alkanes comprising from 4 to 12 carbon atoms;

in a second separation stage, a propane fraction is separated off and the propane fraction is used for degassing the polymer particles discharged from the reactor;

wherein a partial pressure of ethylene in the propane fraction used for degassing is less than 6000 Pa, and a partial pressure of a sum of further 1-olefins and alkanes comprising from 4 to 12 carbon atoms in the propane fraction is less than 10000 Pa; the apparatus comprising:

a gas-phase reactor comprising a bed of polymer particles;

a recycle gas line connected to the reactor for carrying away and recirculating reaction gas, wherein the reaction gas comprises propane and unpolymerized ethylene;

a product offtake line for continuously or discontinuously taking off polymer particles from the reactor, wherein the product offtake line is connected to a degassing vessel for separating polymer particles and gas;

a particle precipitation unit connected to the degassing vessel for freeing gas of entrained fine particles;

a first separation unit connected to a particle precipitation unit for separating off a high-boiling fraction comprising further 1-olefins, alkanes comprising 4 to 10 carbon atoms, or mixtures thereof;

a second separation unit connected to a top of the first separation unit for separating off a propane fraction;

a propane line connected to a bottom of the second separation unit and in turn is connected to the degassing vessel to degas the polymer particles using the propane fraction after passing an evaporation unit;

wherein the first separation unit is such that the partial pressure of ethylene in the propane fraction entering the degassing vessel is less than 6000 Pa, and the second separation unit is such that the partial pressure of 1-olefins and alkanes comprising from 4 to 12 carbon atoms in the propane fraction entering the degassing vessel is less than 10000 Pa.

23. The apparatus according to claim 21, wherein the first separation unit, the second separation unit, or a combination thereof carry out a separation by distillation.

24. The apparatus according to claim 22, wherein the first separation unit, the second separation unit, or a combination thereof carry out a separation by distillation.

25. The process according to claim 1, wherein the reaction gas comprises propane, less than 1 mol % of ethylene, and less than 4 mol % of a proportion of 1-olefins and alkanes comprising from 4 to 12 carbon atoms.

* * * * *